(12) United States Patent
Forgues et al.

(10) Patent No.: US 9,061,392 B2
(45) Date of Patent: Jun. 23, 2015

(54) CONTROLLED ELECTRO-PNEUMATIC POWER TOOLS AND INTERACTIVE CONSUMABLE

(76) Inventors: Sylvain Forgues, Blainville (CA); Brigitte Labelle, Blainville (CA)

( * ) Notice: Subject to any disclaimer, the term of this patent is extended or adjusted under 35 U.S.C. 154(b) by 1013 days.

(21) Appl. No.: 13/182,811

(22) Filed: Jul. 14, 2011

(65) Prior Publication Data

US 2012/0007748 A1 Jan. 12, 2012

Related U.S. Application Data

(63) Continuation-in-part of application No. 12/974,064, filed on Dec. 21, 2010, now abandoned, which is a continuation-in-part of application No. 12/460,836, filed on Jul. 24, 2009, now Pat. No. 7,954,348.

(60) Provisional application No. 61/135,993, filed on Jul. 25, 2008.

(51) Int. Cl.
| | | |
|---|---|---|
| *G06F 19/00* | (2011.01) |
| *B24B 23/02* | (2006.01) |
| *B23B 31/00* | (2006.01) |
| *B24B 49/00* | (2012.01) |
| *B24B 49/14* | (2006.01) |
| *B24B 55/00* | (2006.01) |
| *B24D 5/02* | (2006.01) |
| *B24D 13/10* | (2006.01) |
| *B25F 5/00* | (2006.01) |
| *B25B 17/00* | (2006.01) |

(52) U.S. Cl.
CPC ............. *B24B 23/026* (2013.01); *B23B 31/005* (2013.01); *B23B 2260/104* (2013.01); *B24B 49/006* (2013.01); *B24B 49/14* (2013.01); *B24B 55/00* (2013.01); *B24D 5/02* (2013.01); *B24D 13/10* (2013.01); *B25F 5/001* (2013.01)

(58) Field of Classification Search
CPC .......... B24D 5/02; B24D 13/10; B23B 1/005; B23B 2260/104; B23B 31/005; B24B 49/006; B24B 49/14; B24B 23/026; B24B 55/00; B25F 5/001
USPC ......................................... 700/174; 81/57.22
See application file for complete search history.

(56) References Cited

U.S. PATENT DOCUMENTS

| | | | |
|---|---|---|---|
| 3,507,337 A * | 4/1970 | Chromy ......................... 173/14 |
| 3,741,317 A * | 6/1973 | Unterschweiger et al. ... 173/109 |
| 3,832,772 A * | 9/1974 | Sumida ........................... 30/392 |
| 3,877,280 A * | 4/1975 | Cornell .................... 29/243.519 |
| 4,157,231 A * | 6/1979 | Phillips ........................ 408/1 R |
| 4,202,067 A * | 5/1980 | Stamatovic ...................... 15/28 |

(Continued)

*Primary Examiner* — Sean Shechtman
*Assistant Examiner* — Thomas Stevens
(74) *Attorney, Agent, or Firm* — Norton Rose Fulbright Canada LLP

(57) ABSTRACT

A controlled electro-pneumatic power tool includes an electro-mechanical adjustable valve, a pneumatic motor and a rotational speed sensor connected to a microcontroller for the selection, monitoring and adjustment adjustment of the rotational speed in real time. Using the communication port data for the consumable can be transmitted to the controlled electro-pneumatic power tool. The controlled electro-pneumatic power tool can read and utilize the transmitted data to select, adjust and maintain the optimum process parameters for the consumable without any input from the operator person. Furthermore, the communicated data can be used to warn the operator person that the tool used is inadequate for the selected consumable.

28 Claims, 5 Drawing Sheets

(56) References Cited

U.S. PATENT DOCUMENTS

| | | | | |
|---|---|---|---|---|
| 4,476,942 A * | 10/1984 | Elkin | ...................... | 173/169 |
| 5,114,070 A * | 5/1992 | Lilja et al. | ...................... | 236/49.3 |
| 5,681,015 A * | 10/1997 | Kull | ...................... | 246/187 C |
| 7,431,682 B2 | 10/2008 | Zeiler et al. | | |
| 7,740,425 B2 | 6/2010 | Zeiler et al. | | |
| 8,133,092 B2 * | 3/2012 | Arcona et al. | ...................... | 451/5 |
| 2001/0052416 A1* | 12/2001 | Wissmach et al. | ...................... | 173/4 |
| 2002/0020538 A1* | 2/2002 | Giardino | ...................... | 173/176 |
| 2002/0060082 A1* | 5/2002 | Watanabe | ...................... | 173/176 |
| 2004/0144577 A1* | 7/2004 | Anderson | ...................... | 180/65.2 |
| 2005/0197044 A1* | 9/2005 | Bolz | ...................... | 451/5 |
| 2006/0159533 A1* | 7/2006 | Zeiler et al. | ...................... | 408/226 |
| 2008/0006424 A1* | 1/2008 | Honsa | ...................... | 173/162.1 |
| 2008/0020714 A1* | 1/2008 | Mezhinsky et al. | ...................... | 455/73 |
| 2008/0032601 A1* | 2/2008 | Arcona et al. | ...................... | 451/1 |
| 2008/0178713 A1* | 7/2008 | Long et al. | ...................... | 81/467 |
| 2008/0204249 A1* | 8/2008 | Chang et al. | ...................... | 340/572.7 |
| 2008/0253608 A1* | 10/2008 | Long et al. | ...................... | 382/100 |
| 2009/0175694 A1 | 7/2009 | Craig et al. | | |
| 2009/0210294 A1* | 8/2009 | Sakamoto et al. | ...................... | 705/11 |
| 2009/0241283 A1* | 10/2009 | Loveless et al. | ...................... | 15/319 |
| 2009/0277658 A1* | 11/2009 | Chen | ...................... | 173/183 |

\* cited by examiner

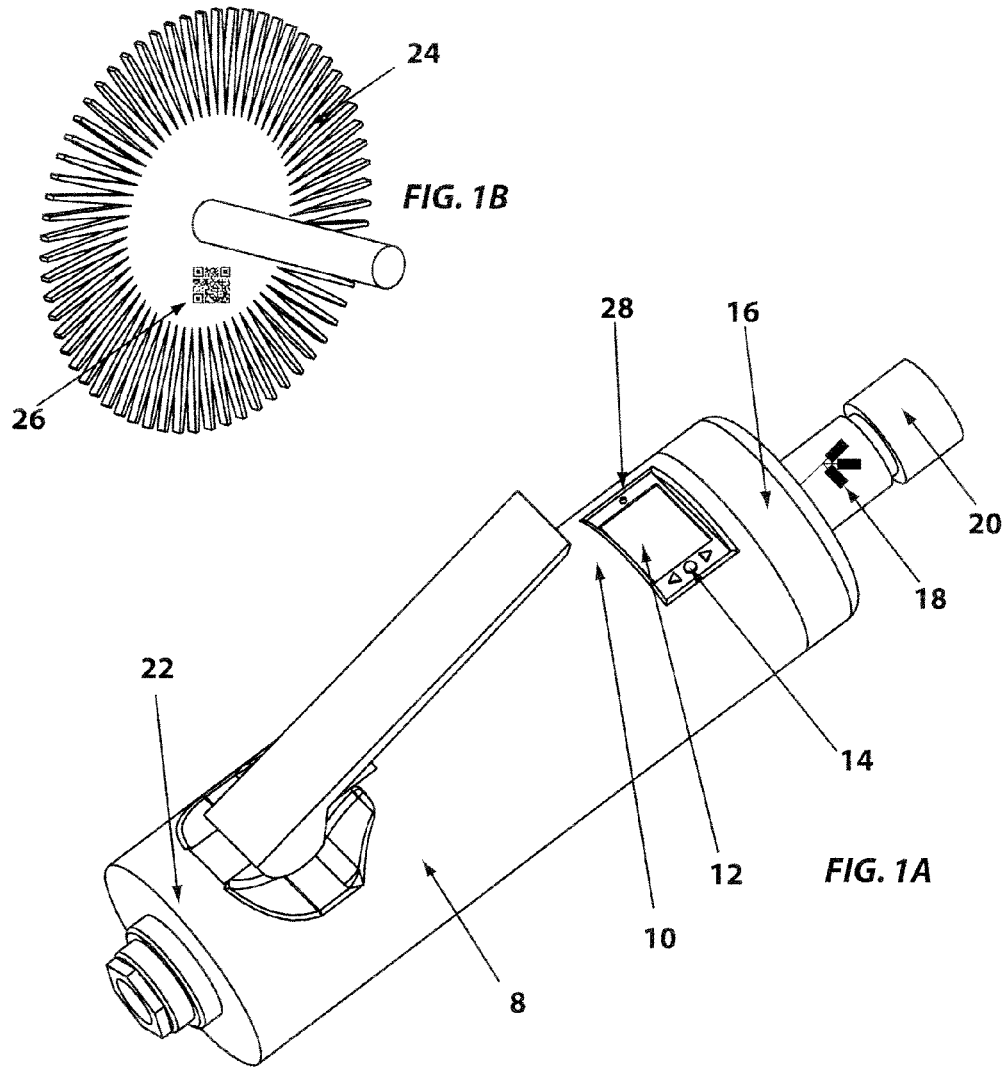
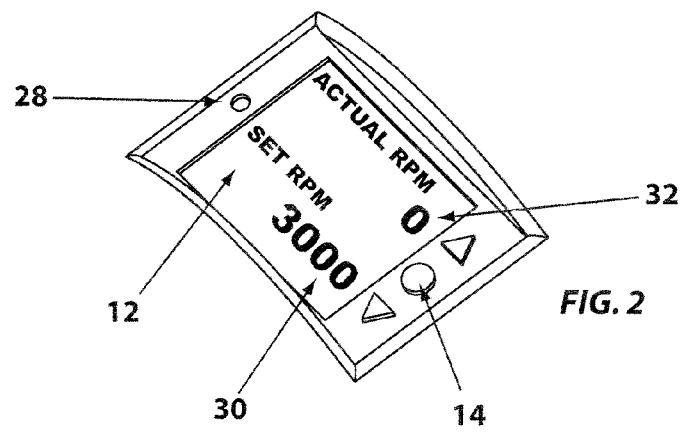

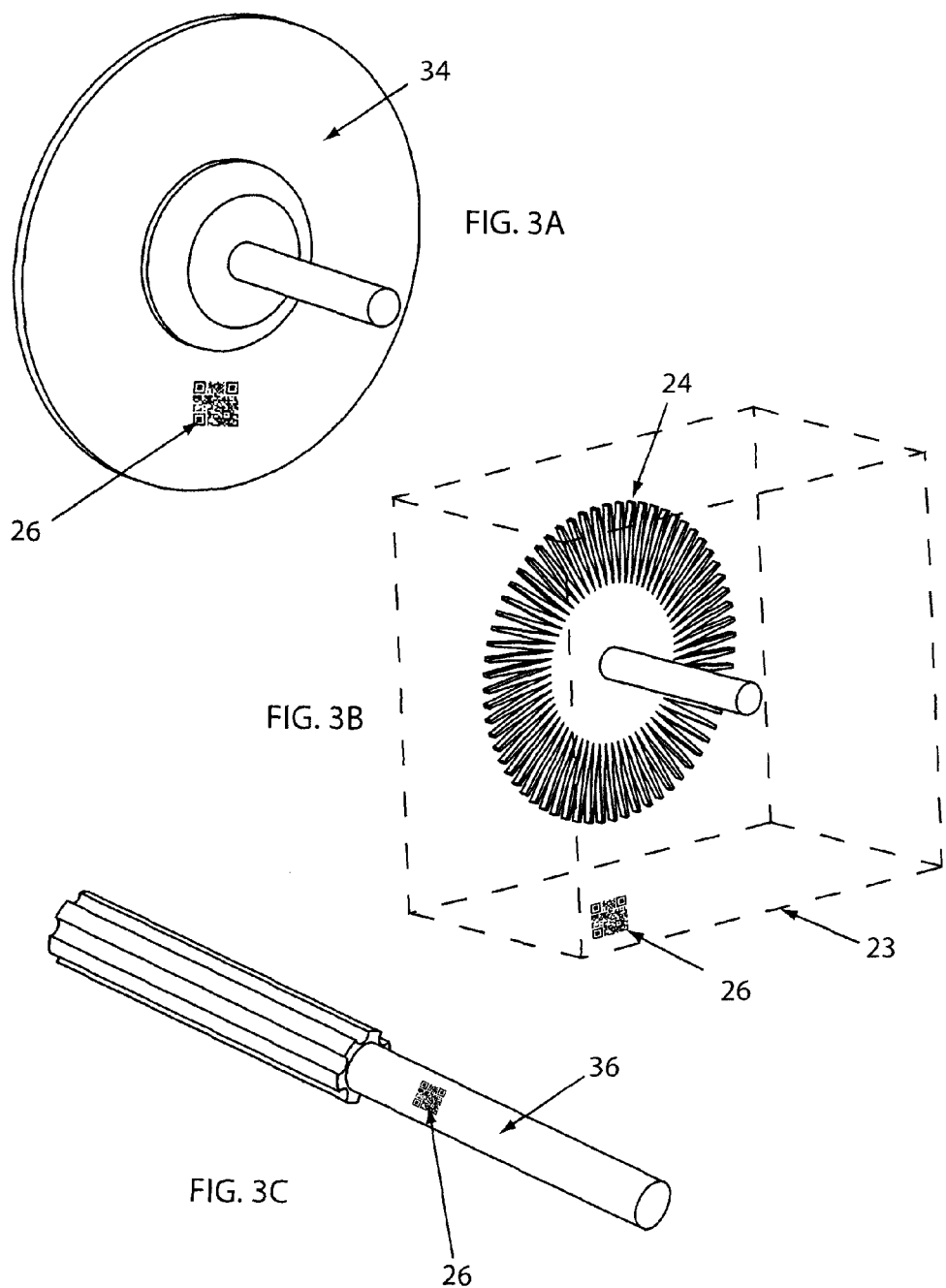

CONTROLLED ELECTRO-PNEUMATIC POWER TOOLS AND INTERACTIVE CONSUMABLE

CROSS-REFERENCE TO RELATED APPLICATION

This application is a C-I-P of application Ser. No. 12/974,064, filed Dec. 21, 2010 now abandoned, which is a C-I-P of application Ser. No. 12/460,836, filed Jul. 24, 2009 now U.S. Pat. No. 7,954,348 and which claims priority based on U.S. Provisional Application Ser. No. 61/135,993 filed Jul. 25, 2008.

TECHNICAL FIELD

The present invention relates in general to the optimal use of pneumatic power tools, and more specifically, to controlled electro-pneumatic power tools with interactive consumables. Both the consumable and the controlled electro-pneumatic power tool incorporate a communication method to transfer important data pertaining to the optimal use of the consumable.

By using this data to set optimal usage parameters, the controlled electro-pneumatic power tool will increase the safety of the operator person, improve the quality and reliability of his work and reduce the potential damages to parts being treated.

BACKGROUND OF THE INVENTION

Pneumatic power tools with specialized consumables are used by operator persons in many different industries to accomplish specific tasks such as dimensioning, defect removal, deburring, blending, finishing, corrosion removal, cleaning, polishing, surface preparation and many more.

In most industries and particularly in the aerospace and automotive industries, the proper control over the parameters of such processes has a large impact on the quality of the work performed. Unfortunately, optimum parameters are seldom available to the operator person using the hand held power tool.

For example, the rotational speed at which the consumable is used has a direct impact on its performance and wear. This is true for most consumables such as, but not limited to discs, sanding bands, grinding wheels, drill bits, rotary cutters and bristle disks. The problem is that the operator person is often unaware of the optimal speed for the consumable. Furthermore, he often only has a single power tool to work with and has a tendency of running at the maximum speed for the power tool even if this maximum speed is much higher than the optimal speed for the consumable. It is possible to calculate the optimal speed for a consumable but the calculation is mathematically complex and requires data and parameters not typically accessible to the operator person.

The use of consumables at inadequate speeds has led to numerous injuries to operator persons when the consumable breaks down or detaches from the spindle and hits the body of the operator person or someone nearby. Furthermore, using consumables at inadequate speeds often leads to the rapid wear of the consumable which significantly increases the cost of the process. Additionally, inadequate rotational speed can damage the part being treated by causing excessive heat or abrasion. This may lead to the replacement of the part further increasing the cost of the process by several orders of magnitude.

For example, hand held power tools are used to remove old sealant and adhesive on aircraft panels. During the maintenance and overhaul of aircraft, panels must be removed to access maintenance areas. The panel's joints and fasteners are often covered with sealant to avoid water infiltration. This old sealant can be removed with rotary cutters and bristle disks. These two types of consumables run at very different speeds usually with different hand held power tools. Most companies do not equip their operators with many different tools in the same family of pneumatic tool, to reduce operational cost. When the wrong power tool is used and/or the wrong speed selected, the rotary cutters made of hard plastic can quickly disintegrate and damage the underlying base material like paints, primers, alodine, and metal. The bristle disks, made of soft plastic, tend to disintegrate when used at higher speeds than indicated. In both cases, the cost of using the wrong rotational speed for the job can be very high.

Many drill bits use special coatings or material to extend their performance and useful life. When the rotational speed of the drill bit is too high, excessive heat is produced by the drilling which quickly burns the tip of the drill bit making it ineffective. The use of the optimal rotational speed for the drill bit size will make drill bits more effective and longer lasting.

The removal of scratches, dents and corrosion on aircraft structure using abrasive wheels and disks would also greatly benefit from optimal controlled rotational speed. When the optimum speed is not used, abrasive wheels and disks can quickly bring the component thickness below its acceptable minimum limit. Furthermore, the wrong speeds can generate heat on the surface thus modifying the heat treatment of the part. This may have an impact on the load bearing capability and fatigue strength of the component.

In general, controlled power tools are not currently available for maintenance work on critical components. Power tools with speed control known in the art have electrical motors as the powering method. As such, the rotational speed of electric motors is usually controlled by limiting the current available to the motor using an electrical motor controller or drive as they are known in the industry. Most electric power tools with drives do not use control methods with closed loop feedback to adjust the speed in real time. This greatly reduces the responsiveness of the power tool when used under variable load by an operator person.

Furthermore, several industrial processes prefer pneumatic tools over electric tools since pneumatic power tools are smaller and more powerfull. However, pneumatic power tools are known for more variability in the rotational speed mainly because of the fluctuations in the supply of compressed air.

The current invention solves this problem by introducing a controlled electro-pneumatic power tool that continuously monitors and adjusts the rotational speed to match the selected speed for the process. This is done using a closed loop feedback control method since the rotational speed needs to be adjusted rapidly and continuously because the force applied on the tool by the operator person will vary constantly. The rotational speed control of pneumatic power tools is intrinsically different from the control of electrical tools. Since air is a compressible gaz, pneumatic power tools have a substantially different power source that necessitates different energy control devices, algorithms, sensors, and power transmission means that will not be obvious to persons with ordinary skills in the art of electrical power tools. Controlled electro-pneumatic power tools with microcontrollers are necessary to use interactive consumable with barcodes or RFID that bring a significant gain in quality, productivity and safety to surface finishing processes.

SUMMARY OF THE INVENTION

It is, therefore, a feature of the present invention to provide a controlled electro-pneumatic power tool including all necessary functions to monitor, adjust and record the key parameters of the process including, but not limited to, the rotational speed of the power tool.

It is another feature of the present invention to provide the details of an interactive power tool consumable that communicates key parameters of the process to a controlled electro-pneumatic power tool which uses the data transmitted to select, set and maintain optimal process parameters without additional input from an operator person.

According to a further feature, the data transmitted is directly related to the consumable and associated process such as, but not limited to, the optimum rotational speed, the maximum applicable force or pressure on the consumable, the maximum applied torque for the consumable, the maximum temperature of the consumable and the typical usage time of the consumable.

In accordance with another feature, to transmit the data, the consumable incorporates on its surface or in its construction a communication device such as, but not limited to, a bar code, an RFID tag, or another communication technology such as Zigbee, Bluetooth, One-net or Rubee. The data may be transmitted passively before the start of the process or actively in real time during the process.

Another feature is that the controlled electro-pneumatic power tool incorporates a microcontroller that can receive data from the consumable through a communication device. This data can be used to set the optimal process parameters of the power tool before the starts of the process. The microcontroller can then monitor and maintain these optimal parameters throughout the process by varying the air input into the tool using an electromechanical adjustable valve and/or the output speed of the tool using a variable speed transmission. Sensors for rotational speed, pressure, torque and temperature are incorporated into the power tool to provide feedback to the microcontroller on whether the set parameters are properly maintained.

According to another feature the consumable actively transmits data, which is used in real time in a feedback loop to adjusts and maintain the optimal parameters for the process.

According to the above features, from a broad aspect, the present invention provides a consumable accessory for use with a controlled electro-pneumatic power tool. The consumable accessory has a communication means associated therewith. The communication means, when transmitted to a microcontroller associated with the electro-pneumatic power tool, permits the microcontroller to access operational parameters of the accessory for operating the electro-pneumatic power tool with the consumable accessory secured thereto within the operational parameters and with continuous monitoring and automatic control of the electro-pneumatic power tool.

According to a still further broad aspect of the present invention there is provided a method of use of a consumable accessory securable to a controlled electro-pneumatic power tool. The method comprises the steps of providing a communication means associated with the consumable accessory to identify the consumable accessory and operational parameters thereof. The method further comprises transmitting the communication means to a microcontroller associated with the electro-pneumatic power tool. The consumable accessory secured to the electro-pneumatic power tool. The method further comprises sensing real time feedback signals of the actual operational parameters of the consumable accessory when operated by an operator person using the electro-pneumatic power tool, and controlling the electro-pneumatic power tool with the consumable accessory within the operational parameters.

BRIEF DESCRIPTION OF THE DRAWINGS

A preferred embodiment of the present invention will now be described with reference to the accompanying drawings in which:

FIG. 1A is a perspective view illustrating a controlled electro-pneumatic power tool with an incorporated barcode scanner;

FIG. 1B is a perspective view of a consumable with a barcode;

FIG. 2 is a perspective view illustrating a typical user interface showing a set optimal rotational speed as read from the barcode on the consumable;

FIGS. 3A to 3B are perspective views illustrating a typical installation of barcodes on consumables;

DETAILED DESCRIPTION OF THE INVENTION

Figure 4:
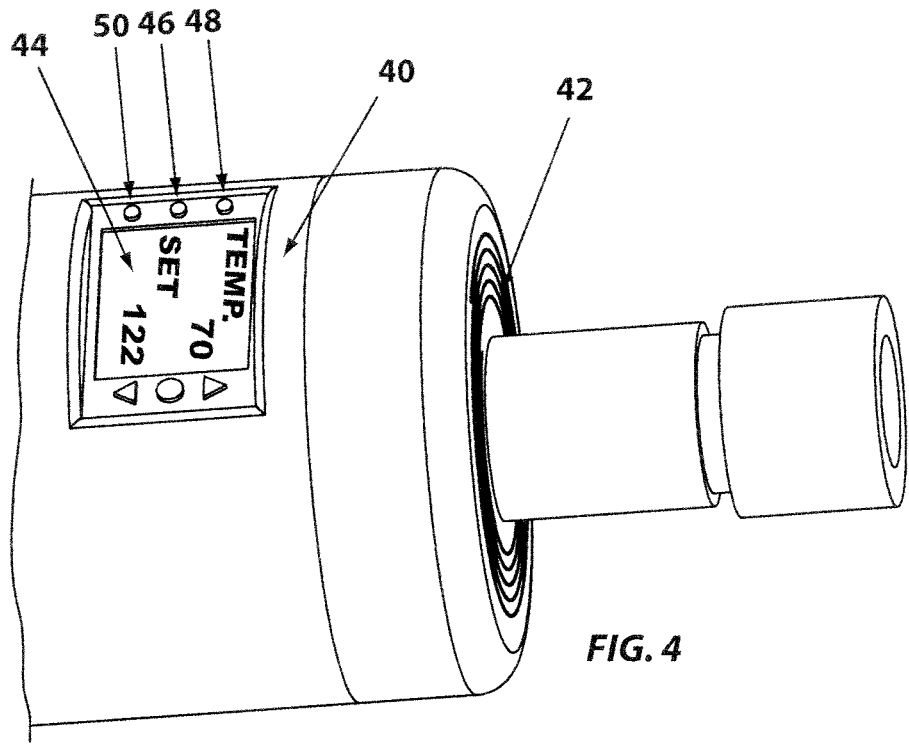
FIG. 4 is a perspective view illustrating a controlled electro-pneumatic power tool with an incorporated RFID reader/writer.

Referring to the drawings in greater detail and by reference characters thereto, there is illustrated in FIG. 1A a controlled electro-pneumatic power tool 8 with integrated microcontroller 10 and user interface 12 including an LCD screen, input buttons 14 and an internal buzzer. Other user interfaces such as lights and an audio output port connecting to an audio headphones or ear bud may also be used. The controlled electro-pneumatic power tool contains a rotational speed sensor 16 that feeds rotational speed information to the microcontroller in real time. The controlled electro-pneumatic power tool may also contain other types of sensors that could be used to feedback strands to the microcontroller to find the optimal rotational speed. Other sensors may include strain gauges 18 in the form of rosettes that can measure the applied force or pressure on the tool as well as the torque of the rotating shaft 20. A thermocouple could also be used as a sensor to measure the temperature. In any case, the sensor feedback information to the microprocessor, in real time, allows the microprocessor to continuously adjust and maintain the optimal rotational speed by varying the air input through an electromechanical valve 22. The optimal parameters for a selected consumable (a.k.a. consumable accessory) 24, as shown in FIG. 1B, can be encoded into a passive communication device such as a barcode 26 affixed to the consumable or a packaging 23 (as shown for example in FIG. 3B) therefore or printed instructional matter, and read by a communication device such as a barcode reader 28 integrated into the controlled electro-pneumatic power tool. The information from the barcode is thus transferred to the microprocessor which uses the information to set and maintain the optimal process parameters such as the rotational speed, the pressure on the abrasive, the torque and the temperature.

FIG. 2 highlights the user interface of the controlled electro-pneumatic power tool which includes the optimal rotational speed for the consumable 30 as transferred from the barcode on the consumable and the actual rotational speed 32 as measured in real time by the rotational speed sensor.

FIGS. 3A to 3C illustrates the embodiment of the bar code 26 on different types of consumables such as abrasion disks 34, bristle disks 24 and reamers 36. In all cases, the information contained in the barcode is specific to the type of consumable on which the barcode is attached and is readily available to the operator. The bar code may be on the packaging of these consumables rather than affixed directly thereto;

Referring to FIG. 4, the controlled electro-pneumatic power tool may contain a wireless communication device 40 such as, but not limited to, RFID, Zigbee, Bluetooth, One-net, Rubee or any other proprietary or non-proprietary communication method. The communication device will enable the power tool to read and write the information on the consumable through an antenna 42. The antenna may be of several different sizes, shapes and location on the tool to maximize the efficiency of the communication. The data on the consumable will be transferred to the microcontroller to set and maintain the optimal process parameters. Once the initial data is transferred, the controlled electro-pneumatic power tool may display selection menus to the operator person to help further refine the parameters for the process. The display 44 may be used to illustrate different key parameters in real time as selected by the operator person. Indication lights with different colors are used to inform the operator that the displayed parameter is within range of OK 46 using a green light or HIGH 48 using a red light. A yellow light 50 may be used to indicate that the data on the consumable has been transferred to the controlled electro-pneumatic power tool.

Figure 5:
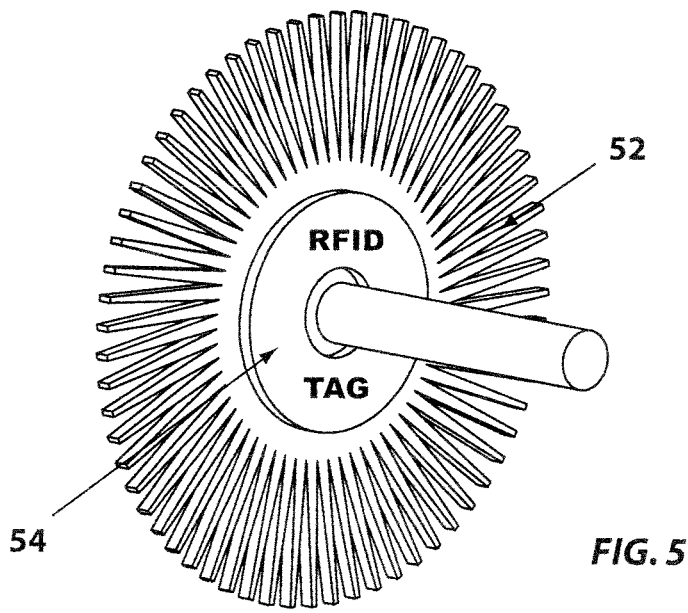
FIG. 5 is a perspective view illustrating a typical installation of a passive RFID tags on a consumable.

With reference to FIG. 5, the wireless label or tag attached to the consumable 52 may be passive of active. A passive tag 54 is read once by the reader incorporated into the controlled electro-pneumatic power tool. This communication takes place before the consumable is used by swiping the label or tag of the consumable near the reader. The exact distance and required line of sight depends on the communication method selected. Passive labels contain data that does not change in time. The controlled electro-pneumatic power tool may use an internal counter to store the cumulative time the consumable has been used. Once the average usage time has elapsed, the controlled electro-pneumatic power tool will warn the operator person that the consumable may be worn and that further usage may result in unsafe operation or deteriorated results.

Figure 6:
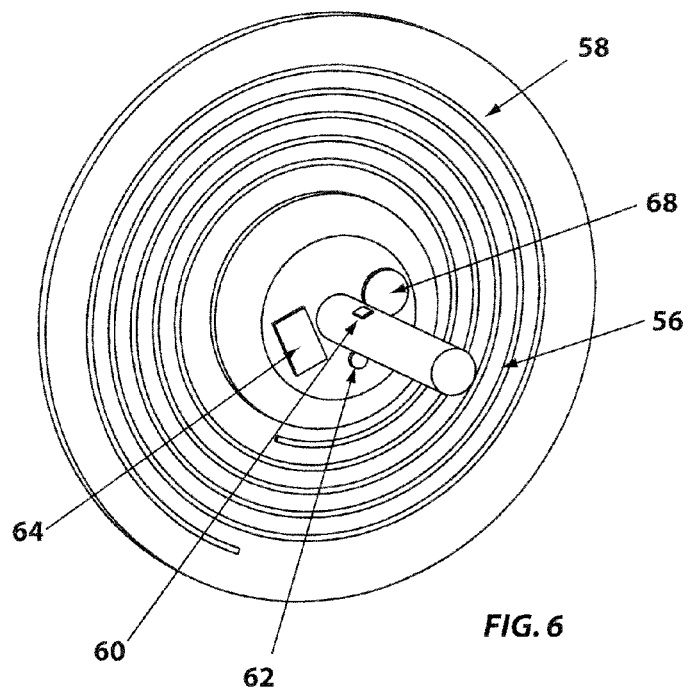
FIG. 6 is a perspective view illustrating a typical installation of active RFID tags on a consumable.

An active tag is illustrated in FIG. 6. An active label can transfer the same data as the passive label but also allows the continuous transmission of data from the antenna 56 of the consumable 58 to the controlled electro-pneumatic power tool. This may include, but is not limited to, the applied force or pressure on the consumable, the applied torque on the tool and the temperature of the consumable. For example, strain gauges 60 may be installed on the shaft or the body of the consumable to measure the strain in real time. The strain is an indication of the applied force and torque on the consumable which has a direct relationship to the level of abrasion on the part. Once a known constant rotational speed is established, the applied force becomes an important parameter in order to use consumables at their optimal condition. Furthermore, these same strain gauges will detect any unbalance that may be found in the consumable. Since an unbalance in the consumable is often an indication of impending failure, the controlled electro-pneumatic power tool reading the data will be able to sound an alarm and shut down before the consumable self-destructs. This will greatly increase the safety of the operator person using the tool as well as other persons nearby.

In a similar fashion, a miniature thermocouple 62 can measure the temperature in real time and relay the information to the controlled electro-pneumatic power tool. This is very beneficial for temperature critical applications where the applied temperature must remain below a certain threshold. This is the case for the surface treatment of several aerospace parts that have been heat treated. An applied temperature above a certain threshold will change the heat treatment along with the mechanical properties of the material. Another example is during the buffing of a new paint layer applied to the exterior of an aircraft. If the rotational speed and the surface temperature of the paint are not controlled the paint can be damaged by the buffing action. A controlled electro-pneumatic power tool receiving temperature data in real time along with the optimal rotational speed at the beginning of the operation can warn the operator person to reduce his activity if the temperature becomes too high. Active tags usually incorporate a communication chip 64 and a battery 68 to ensure the continuous transmission of real time data.

Figure 7:
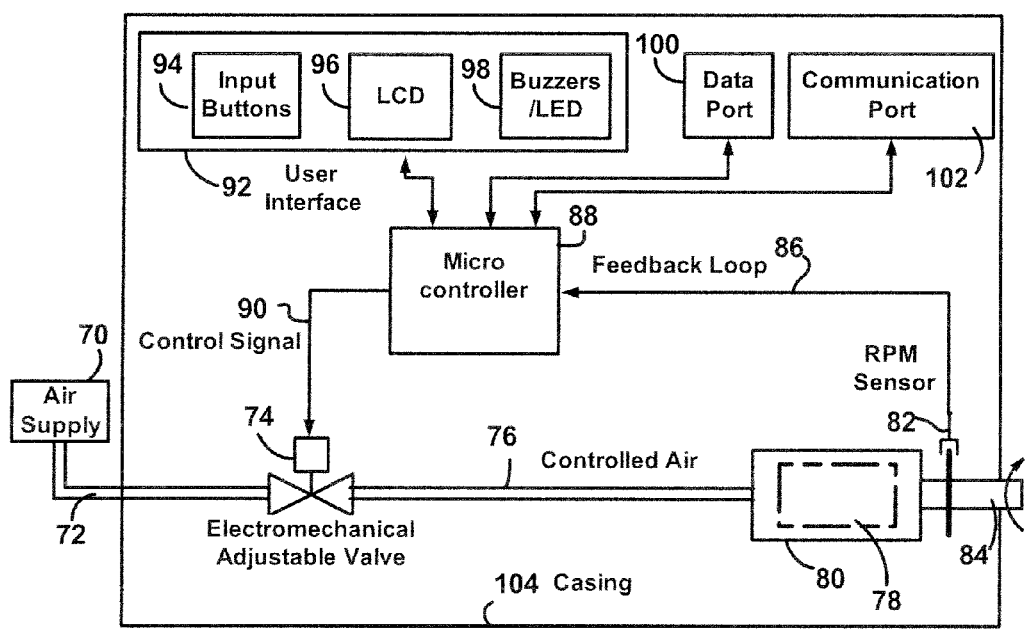
FIG. 7 is a schematic and block diagram illustrating a hand held pneumatic power tool with an incorporated communication control device and sensor.

Referring to FIG. 7, an air supply line 72 feeds an adjustable valve 74. The valve may be of any electromechanical type without departing from the scope of the invention. Possible types are the diaphragm type or the proportional solenoid type as well as the ball type. It may also include additional on-off solenoids to properly control the flow of air 76 to the pneumatic motor 78 of the air tool 80. Depending on the desired control parameter of the application, the pneumatic motor may be hooked up to one or several different sensors 82 such as rotational speed, applied force, applied torque and temperature usually installed near or on the rotating shaft 84 of the pneumatic power tool. Data from the sensor is fed back to the microcontroller 88 through the connection 86. The microcontroller compares the measured value of the parameter with the desired value of the parameter and adjusts the electromechanical valve opening using the control signal 90. This is done at very high sampling rates using control algorithms. Closed loop control algorithms may include PID algorithms, feed forward algorithms or fuzzy logic algorithms used independently or combined for greater performance.

The desired speed of the tool is selected through a user interface 92 which may include a number of input buttons 94 on the tool, a liquid crystal display (LCD) 96, buzzers and/or Light Emitting Diodes (LED) 98 or other interactive devices. The buzzers and LEDs are used to inform the operator person of an important situation. For example, if the air available to the tool is insufficient to allow the controller to maintain the desired control parameter. In this case, the microprocessor may stop the pneumatic tool, sound the buzzer and illuminate some LEDs to warn the operator person. Both the display and the buttons may be combined through a touch screen interface.

When required, the tool may include a data port 100 to continuously save process parameters. These parameters may include the date, time, the desired control parameters, the actual control parameters, the name of the operator, a description of the task performed or any other data relevant to the operator to the quality control organization. The data logged may be saved to internal memory or to removable memory such as USB or SD devices. The data port may also be used to update the microprocessor software and save useful process and/or operator information in the controller.

The tool will also contain a communication port 102 to communicate to read and write optimal process information from the consumable. Several different communication techniques are suitable to transfer data between the consumable and the controlled electro-pneumatic power tool. Since the consumable will be in close proximity to the controlled electro-pneumatic power tool, a low power and/or short distance communication technique is adequate. Suitable communication techniques may be based on existing protocols such as, but not limited to, Zigbee, Bluetooth, One-net, Rubee Zigbee or RFID. Other communication methods such as one or two dimensional barcodes may also be used for communication as well as protocols developed specifically for this type of application.

The control electronics for the pneumatic tool may be directly incorporated into the casing 104 of the pneumatic tool. The casing may be NEMA approved or even explosion proof if required. However, the electronics may be physically separate from the pneumatic tool and installed in a portable case. As a minimum, the sensor must be attached to the pneumatic tool. In this situation, the sensor and case with the electronics would be connected by a sensor wire or through a separate wireless connection.

Figure 8:
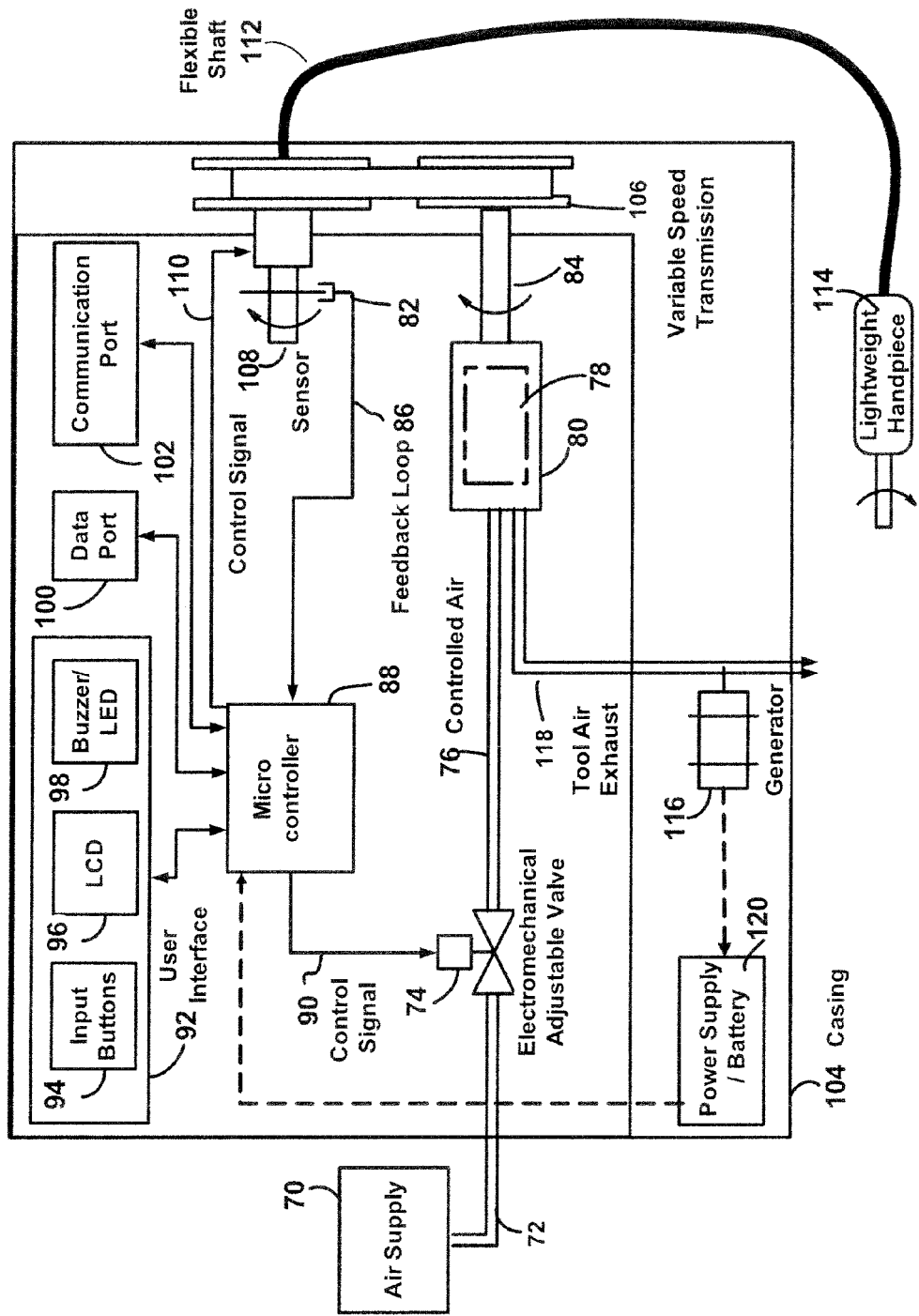
FIG. 8 is a schematic and block diagram illustrating a hand held electric power tool with incorporated battery power supply and continuously variable speed transmission with flexible shaft and lightweight hand piece.

FIG. 8 is a further embodiment of the controlled electro-pneumatic tool including a variable speed transmission 106 to greatly increase the range of rotational speed usage of the pneumatic tool. This transmission is adjusted in real time by the microcontroller 88 through a closed loop control signal 110. By varying both the input air through the electromechanical 74 valve and the output shaft rotational speed through the variable transmission, a much larger range of operational speed can be attained and controlled. The power tool can include a flexible shaft 112 with a lightweight hand piece 114. This provides greater flexibility as the lightweight hand piece reduces the fatigue of the operator person. The electronics in the pneumatic tool may be fed by a generator 116 that uses the energy from the tool air exhaust 118. This will feed a battery pack 120 to power the electronics.

It is within the ambit of the present invention to cover any obvious modifications provided such modifications fall within the scope of the present invention as defined by the appended claims.

The invention claimed is:

1. A consumable accessory for use with a controlled electro-pneumatic power tool, said consumable accessory having a communication means associated therewith, said communication means having associated data transmittable to a microcontroller associated with said electro-pneumatic power tool, the data corresponding to operational parameters of said consumable accessory for operating said electro-pneumatic power tool within said operational parameters with said consumable accessory secured to a drive shaft of the electro-pneumatic power tool, the electro-pneumatic power tool including sensors feeding real time information signals to said microcontroller indicative of one of an applied force and a pressure on the drive shaft of said electro-pneumatic power tool, a rotational speed of said drive shaft, and a temperature of said consumable accessory for continuous monitoring and automatic control of said electro-pneumatic power tool based on the real time information signals from the sensors and the operational parameters of said consumable accessory, a screen associated with the electro-pneumatic power tool displaying selection means based on the operational parameters associated with said communication means, and inputting means associated with the electro-pneumatic power tool to interact with an operator person.

2. A consumable accessory as claimed in claim 1, wherein said communication means includes a communication code affixed to said consumable accessory.

3. A consumable accessory as claimed in claim 1, wherein said communication means includes a communication code provided as printed matter on packaging material associated with said consumable accessory.

4. A consumable accessory as claimed in claim 1, wherein said communication means includes a device suitable for communication techniques based on protocols.

5. A consumable accessory as claimed in claim 4, wherein said electro-pneumatic power tool has an antenna associated with said electro-pneumatic power tool and disposed for wireless communication with said communication means.

6. A consumable accessory as claimed in claim 5, wherein there is further provided an internal counter circuit in said electro-pneumatic power tool associated with said microcontroller to store a cumulative time of use of said consumable accessory, and means to inform said operator person that the consumable accessory may require replacement based on said operational parameters entered in said microcontroller.

7. A consumable accessory as claimed in claim 5, wherein there is further provided a data port to save process parameters during use of said consumable accessory by said electro-pneumatic power tool, to store in memory, data relevant to an operator person operating said electro-pneumatic power tool with said consumable accessory.

8. A consumable accessory as claimed in claim 1, wherein said operational parameters of said consumable accessory comprises at least one of optimum rotational speed, maximum applicable force, pressure applied, maximum temperature and time of use of said consumable accessory.

9. A consumable accessory as claimed in claim 1, wherein said microcontroller is integrated in said electro-pneumatic power tool, said communication means including wireless communication.

10. A consumable accessory as claimed in claim 9, wherein said continuous control of said electro-pneumatic power tool is effected by varying air inputted into the electro-pneumatic power tool using one of an electromechanical adjustable valve and controlling a variable speed transmission of said power tool.

11. A consumable accessory as claimed in claim 10, wherein said air inputted into said electro-pneumatic power tool is effected through an electromechanical adjustable valve to control a flow of air to a pneumatic motor of said power tool; said microcontroller adjusting said adjustable valve with a closed loop control signal.

12. A consumable accessory as claimed in claim 11, wherein said variable speed transmission is connected to the drive shaft of said electro-pneumatic power tool, said microcontroller adjusting a drive speed of said transmission in real time based on said real time information signals; said adjustable valve, in combination with said variable speed transmission, providing a range of operational speeds of said drive shaft.

13. A consumable accessory as claimed in claim 1, wherein said microcontroller is integrated into said electro-pneumatic power tool, said electro-pneumatic power tool having the screen, the inputting means and audible alarm means.

14. A consumable accessory as claimed in claim 1, wherein the sensors comprises a strain gauge to measure one of an applied force and a pressure on the drive shaft of said electro-pneumatic power tool and a rotational speed sensor to measure the rotational speed of said drive shaft, said strain gauge and speed sensor continuously sending real time information signals to said microcontroller.

15. A consumable accessory as claimed in claim 1, wherein the sensor indicative of a temperature of said consumable accessory is a thermocouple.

16. A consumable accessory as claimed in claim 1, wherein said consumable accessory is further provided with a communication chip and a battery to feed said communication chip to provide continuous transmission of said data in real time.

17. A consumable accessory as claimed in claim 1, wherein said microcontroller is contained within a separate housing associated with said electro-pneumatic power tool.

18. A consumable accessory as claimed in claim 1, wherein there is further provided a variable speed transmission controlled by said microcontroller for driving a flexible drive connected to said electro-pneumatic power tool for driving the drive shaft.

19. A method of use of a consumable accessory securable to a controlled electro-pneumatic power tool, said method comprising the steps of:
   i) providing a communication means associated with said consumable accessory, the communication means having associated data to identify said consumable accessory and operational parameters thereof;
   ii) transmitting the data associated with said communication means to a microcontroller associated with said electro-pneumatic power tool;
   iii) securing said consumable accessory to a drive shaft of said electro-pneumatic power tool;
   iv) sensing real time feedback signals of said operational parameters of said consumable accessory automatically forwarded to said microcontroller when operated by an operator person using said electro-pneumatic power tool;
   v) sensing real time information signals from a plurality of sensor to said microcontroller, the real time information signals being indicative of one of an applied force and a pressure on the drive shaft of said electro-pneumatic power tool, a rotational speed of said drive shaft, and a temperature of said consumable accessory;
   vi) controlling said electro-pneumatic power tool with said consumable accessory within said operational parameters and based on the real time information signals; and
   vii) displaying selection means on a screen associated with the electro-pneumatic power tool based on the operational parameters associated with said communication means.

20. A method as claimed in claim 19, wherein said step i) comprises affixing a communication code to one of said consumable accessory or on printed matter or packaging material associated with said consumable accessory.

21. A method as claimed in claim 20, wherein said step ii) comprises transmitting through a wireless communication the data associated with said communication code.

22. A method as claimed in claim 19, wherein said vi) automatically controlling said electro-pneumatic power tool by one of a control air valve or a variable speed transmission.

23. A method as claimed in claim 19, wherein said microcontroller is housed in said electro-pneumatic power tool, said electro-pneumatic power tool having inputting means, there being further provided the steps of inputting information in said microcontroller by said operator person by the use of said inputting means, and audible means associated with said electro-pneumatic power tool and controlled by said microcontroller.

24. A method as claimed in claim 23, wherein there is further provided the step of recording and storing time of use of said consumable accessory by the use of a counter circuit and a memory associated with said microcontroller.

25. A method as claimed in claim 23, wherein there is further provided the step of storing in a memory associated with said microcontroller, data relevant to said operator person operating said electro-pneumatic power tool with said consumable accessory.

26. A method as claimed in claim 19, wherein there is further provided the steps of securing one or more active elements and a wireless transmission means to said consumable accessory sensing real time data from said active elements, and transmitting real time data relating to said active elements to said microcontroller for control of said electro-pneumatic power tool.

27. A method as claimed in claim 26, wherein said active elements provide at least one of sensing an applied force on said consumable accessory by said operator person, measuring a temperature of said consumable accessory and measuring strain in a connecting shaft of said consumable accessory.

28. An assembly comprising:
   an electro-pneumatic power tool having a cylindrical shaped body, the electro-pneumatic power tool including a plurality of sensors;
   a consumable accessory removably securable to a drive shaft of the electro-pneumatic power tool, the consumable accessory being associated with communication means, the communication means having associated data corresponding to operational parameters of the consumable accessory;
   a microcontroller associated with the electro-pneumatic power tool and contained in a separate housing of said electro-pneumatic power tool, the microcontroller being configured to receive the data from the consumable accessory and real time information signals from the plurality of sensors indicative of one of an applied force and a pressure on a drive shaft of said electro-pneumatic power tool, a rotational speed of said drive shaft, and a temperature of said consumable accessory, the microcontroller being configured for continuous monitoring and automatic control of the electro-pneumatic power tool based on the operational parameters of the consumable accessory and the real time information signals; and
   a screen associated with the electro-pneumatic power tool, the screen displaying selection means based on the operational parameters associated with said communication means; and
   inputting means associated with the electro-pneumatic power tool.

* * * * *